Nov. 14, 1939.  R. T. HOSKING  2,179,575
LOCK WASHER
Filed Sept. 18, 1935
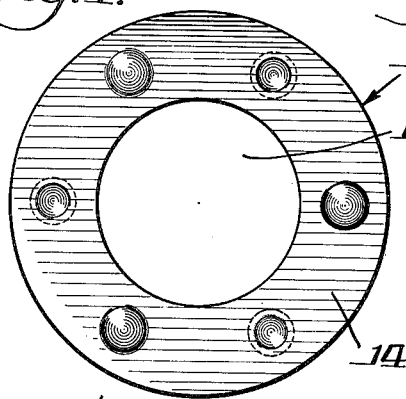
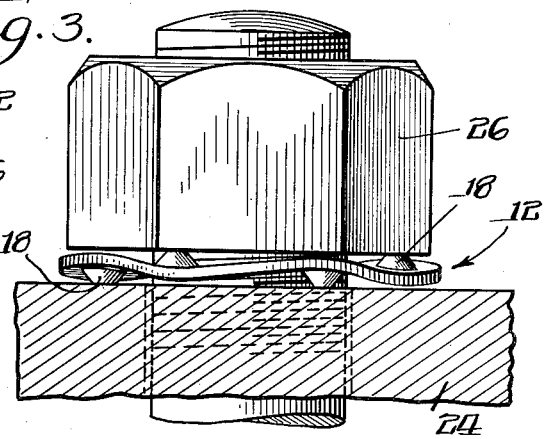
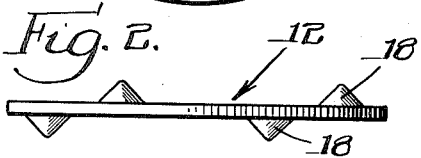
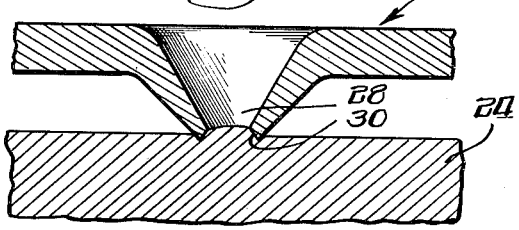
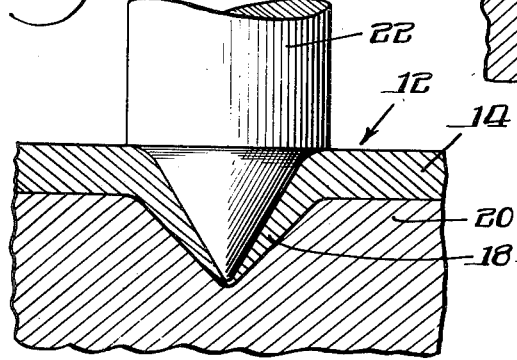
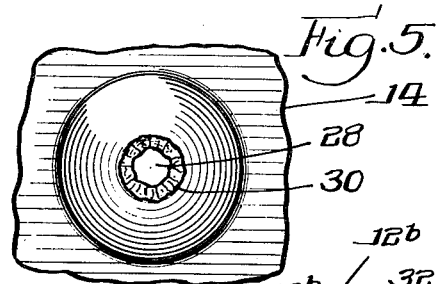
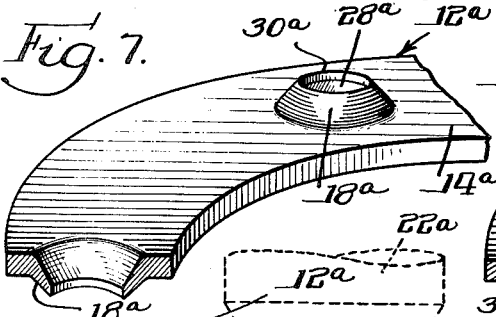
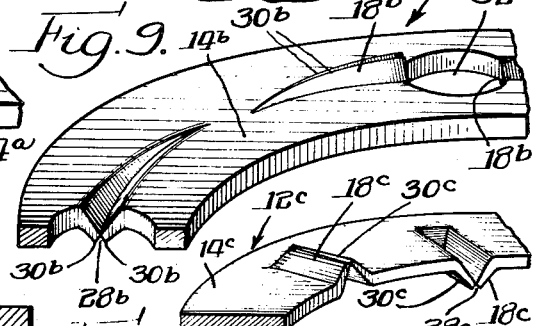
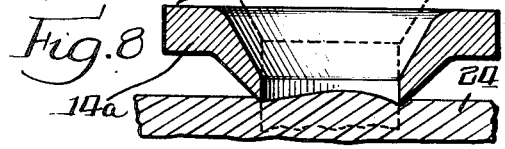
Inventor
Richard T. Hosking
By: Cox & Moore ATTORNEYS Patented Nov. 14, 1939

2,179,575

UNITED STATES PATENT OFFICE 2,179,575

LOCK WASHER

Richard T. Hosking, Wilmette, Ill., assignor, by mesne assignments, to Illinois Tool Works, Chicago, Ill., a corporation of Illinois Application September 18, 1935, Serial No. 41,069

6 Claims. (Cl. 151—35)

This invention relates generally to lock washers, and more particularly to lock washers of the resilient or spring type having laterally projecting teeth or locking elements positioned on opposite sides of the washer body, and to methods of making such washers.

It is an object of this invention to provide a lock washer having crests or protuberances borne on opposite sides of the washer body adapted to lockingly engage the work, said crests providing craters or recesses adapted to receive material of the work shifted during the clamping of the washer against the work.

It is a further object of the invention to provide projections or protuberances, as stated above, which consist of oppositely disposed wall portions terminating in work engaging corners adapted to be embedded within the surface of the work, and I propose to provide projections of protuberances of varied forms best suited to the conditions for which the washer is to be used.

A still further object of my invention is to provide methods of forming washers of the type set forth above, which includes the step of drawing the metal of the body to form projections, and to thus produce a very thin crest which will break down under clamping loads and thereby present locking edges or corners.

More specifically, my invention contemplates the provision of washers of the type set forth above, in which the locking or work engaging elements constitute truncated cone projections having annularly disposed locking edges or corners.

Still more specifically, my invention contemplates projections or protuberances in washers of the type referred to above, which present work engaging edges extending in substantial parallelism with the washer body on opposite sides thereof.

It is a still further object of the invention to provide spring type washers having locking elements or protuberances projecting on opposite sides of the body, which include converging wall sections, the outer portions of which provide work engaging corners.

It is another object of the invention to provide spring washers, as hereinbefore set forth, wherein alternate protuberances or projections extend in opposite directions from the washer body to enable the washer body to yield, and thus present a washer body which is undulated in circumferential cross section when the washer is clamped in position.

The foregoing and numerous other objects and advantages will be more apparent when considered in connection with the accompanying drawing, wherein—

Figure 1 is a plan view of a spring washer which represents one embodiment of my invention;

Figure 2 is a side elevational view of the washer shown in Figure 1;

Figure 3 discloses the washer of Figures 1 and 2 partially tightened against the surface of the work piece through the agency of a nut;

Figure 4 is an enlarged fragmentary cross sectional view of one of the locking elements or projections disclosing the manner in which the crater at the outer end of the projection is adapted to receive material of the work, and also the manner in which the edges or corners presented by the locking element are adapted to embed themselves within the surface of the work;

Figure 5 is a bottom view of the locking element disclosed in Figure 4 detached from the work piece;

Figure 6 discloses a method whereby the projections or locking elements may be formed so as to produce thin stock at the outer extremities thereof, which will break down under a clamping load to provide a crater and work engaging corners;

Figure 7 discloses a modified form of locking element or projection;

Figure 8 is an enlarged cross sectional view of the device shown in Figure 7 disclosing the manner in which the projections function to lockingly engage the work.

Figure 9 is a fragmentary perspective view of the washer equipped with a still further modified locking element, the crest of these elements extending in a circumferential direction on opposite sides of the washer body; and Figure 10 discloses another modification wherein the projections extend radially of the washer body and present work engaging edges positioned out of the plane of the washer body on opposite sides thereof and extending in substantial parallelism with the washer body.

Referring now to the drawing more in detail wherein like numerals have been employed to designate similar parts throughout the various figures, it will be seen that my invention contemplates a washer which I have designated generally in Figures 1 to 6, inclusive, by the numeral 12. This washer 12 includes an annular body portion 14 surrounding a central bolt or screw receiving aperture 16. The washer is composed of suitable spring stock.

Spaced along and extending from opposite sides of the washer body 14 is a plurality of work engaging or locking elements 18. In Figures 1 to 6, inclusive, these locking elements or projections 18 are cone-shaped and are preferably formed by the use of a die block 20 and punch 22. When the punch 22 is brought into engagement with the washer stock, the metal is drawn into the die block 20, as clearly illustrated in Figure 6, so as to present a very thin pointed shell at the outer extremity of the protuberance or projection 18. The thickness of the metal of the stock forming the protuberance increases toward the washer body, and the outer extremity of the projection is so thin that, when the washer is tightened against the surface of a metallic work piece 24—for example, by means of a nut 26—this thin portion will break down or give way so as to present a crater 28, as clearly indicated in Figures 4 and 5. When the work piece is wood or similar relatively soft material, the protuberances will not break down, but penetrate the material and act as anchors.

The breaking down of the crest of the projections presents sharp work engaging corners or edges 30 which are adapted to firmly embed themselves within the surface of the work piece 24. The craters 28 serve to receive the material of the work which is shifted during the clamping operation, as clearly indicated in Figure 4. In this way the projections or protuberances become firmly embedded within the surface of the work and the clamping surface of the nut. It will be noted that the projections or protuberances are laterally disposed on opposite sides of the washer stock so that, when the washer is clamped in position, it will partake of an undulated form, the spring tension in the body thus serving to yieldably urge the locking corners or edges of the projections into operative association with the surfaces of the work. In Figure 3 the nut 26 is shown in its partially clamped position to more clearly illustrate the undulated form taken by the washer. When the nut is completely tightened against the washer, the surfaces of the body disposed immediately on the opposite side of each projection, will yieldably bear against the contiguous surface of the work. Thus, when the washer is clamped in position, the resiliency of the stock, as well as the locking effectiveness of the corners and craters of the projections 18, serves to effectively secure the nut against retrograde movement. In this connection it should be understood that the term "corners" as employed herein is used in its broadest sense. That is to say, the term "corner" as used herein is not limited to a point, but constitutes either a point or line where two or more surfaces converge. In other words, the term "corner" includes either a point or line. Thus the corners presented by the breaking down of the outer extremities of the projections 18 may either partake of points or edges adapted to lockingly engage the work.

In Figures 7 and 8 I have disclosed a washer indicated generally by the numeral 12a equipped with projections 18a of modified form. The washer 12a includes an annular body 14a, from which the projections 18a extend on opposite sides. These projections 18a present truncated cone structures providing annular work engaging edges or corners 30a surrounding a crest 28a. In forming the projections 18a, a plunger or punch 22a indicated by dotted lines in Figure 8, may be employed. This punch cooperates with a suitable die block (not shown) in actually punching a hole to provide the crater 28a, and to provide the annular locking edge or corner 30a. It will be noted that the edges or corners 30a are acute, thereby materially enhancing the locking effectiveness thereof in digging into the work.

In Figure 9 I have disclosed a washer indicated by the numeral 12b, which includes a body 14b and a plurality of projections or protuberances 18b. These protuberances 18b include wall sections converging toward each other, as indicated in Figure 9, to provide adjacent work engaging edges 30b, between which a circumferentially extending crest 28b is presented. Particular attention is directed to the fact that these circumferential projections or protuberances 18b extend circumferentially from opposite sides of an aperture 32. As indicated at the right side of Figure 9, the projection or protuberance 18b extending to the left of the aperture 32 projects upwardly from the body 14b, whereas the projection 18b extending to the right of the aperture 32 projects downwardly from the body 14b. Thus a clamping member, such as the nut 26, may be tightened against the projections 18b with a force less than that required to loosen the nut after it has been tightly clamped against the washer.

In Figure 10 a still further modified washer 12c is disclosed. The body 14c of this washer is formed with a plurality of projections or locking elements 18c, which extend radially of the washer body and project from opposite sides thereof. In the disclosed embodiment I have shown these projections positioned along the inner margin of the body, but obviously they could also be used along the outer margin as well, and, in fact, they could be used along both the inner and outer margins. The projections 18c are adapted to be formed in a manner similar to that described in connection with Figure 6, the only difference being that an elongated structure of V-shaped cross section, as distinguished from a conical form, is provided. In other words, in one form a conical structure is presented, and in Figure 10 the projections partake of a prismatic form. Locking or work engaging edges 30c are presented, and a radially extending crater 28c is presented between these locking edges or corners.

It will also be understood that, while in the drawings I have disclosed the projections or work engaging elements in circumferential alinement, said elements may be arranged in staggered relation or in other formations without departing from the spirit and scope of the present invention.

Furthermore, the invention is not limited to flat type washers but is equally adaptable to lock washers of other shapes, for example, conical washers.

From the foregoing it will be apparent that my invention contemplates lock washers of the spring type, in which a plurality of work engaging elements or protuberances project beyond the bounding planes of the body on opposite sides thereof, and that said elements include oppositely disposed wall sections extending axially from the body to provide work engaging corners or edges, and also craters for receiving material of the work which is shifted during the clamping operation. In the structures disclosed in the drawing these oppositely disposed wall sections converge toward each other, and thus, at their outer portions, present oppositely disposed work engaging corners. While I have disclosed specific embodiments of the invention, it should be understood that said invention is capable of other modifications and changes without departing from the spirit and scope of the appended claims.

Having thus described my invention, what I claim as new and desire to secure by Letters Patent is:

1. A lock washer including an annular body of spring stock, and a plurality of work engaging elements projecting beyond the bounding planes of said body on opposite sides thereof, said elements including wall sections converging toward a common point, the outer portions of which provide work engaging corners adapted to be embedded within the work when the washer is clamped thereagainst.

2. A lock washer including an annular body of spring stock, and a plurality of work engaging elements projecting beyond the bounding planes of said body on opposite sides thereof, said elements including converging wall sections, the outer portions of which provide work engaging corners adapted to be embedded within the work when the washer is clamped thereagainst, said elements also providing recesses adapted to receive material of the work shifted in response to the clamping of the projections thereagainst.

3. A lock washer including an annular body of spring stock, and a plurality of work engaging elements projecting beyond the bounding planes of said body on opposite sides thereof, each of said elements including wall sections inclined toward each other, said sections having a thickness which is less at the outer extremities than at the base thereof, whereby to present work engaging corners when the washer is clamped against a work piece.

4. A lock washer including an annular body of spring stock, and a plurality of radially extending work engaging elements projecting beyond the bounding planes of said body on opposite sides thereof, each of said elements including wall sections inclined toward each other and presenting radial work engaging edges adapted to be embedded within the work when the washer is clamped thereagainst.

5. A lock washer including an annular body of spring stock, and a plurality of radially extending work engaging elements projecting beyond the bounding planes of said body on opposite sides thereof, each of said elements including wall sections inclined toward each other and presenting radial work engaging edges adapted to be embedded within the work when the washer is clamped thereagainst, said edges being substantially parallel with the washer body adjacent thereto.

6. A lock washer including an annular body of spring stock, and a plurality of work engaging elements projecting beyond the bounding planes of said body on opposite sides thereof, said elements including wall sections converging toward a common point, the outer portions of which provide work engaging corners adapted to lockingly engage the work when the washer is clamped thereagainst, the elements on one side of said body being disposed alternately with respect to the elements on the opposite side, whereby to enable the washer body to assume an undulated form when clamping against the work.

RICHARD T. HOSKING.